(12) United States Patent
Qian et al.

(10) Patent No.: US 12,437,449 B2
(45) Date of Patent: Oct. 7, 2025

(54) CREDIBLE FRUIT TRACEABILITY METHOD AND DEVICE BASED ON FRUIT TEXTURE ATLAS AND BLOCKCHAIN

(71) Applicant: INSTITUTE OF AGRICULTURAL RESOURCES AND REGIONAL PLANNING, CHINESE ACADEMY OF AGRICULTURAL SCIENCES, Beijing (CN)

(72) Inventors: Jianping Qian, Beijing (CN); Wenbin Wu, Beijing (CN); Yun Shi, Beijing (CN); Qiangyi Yu, Beijing (CN); Peng Yang, Beijing (CN)

(73) Assignee: INSTITUTE OF AGRICULTURAL RESOURCES AND REGIONAL PLANNING, CHINESE ACADEMY OF AGRICULTURAL SCIENCES, Beijing (CN)

( * ) Notice: Subject to any disclaimer, the term of this patent is extended or adjusted under 35 U.S.C. 154(b) by 479 days.

(21) Appl. No.: 17/698,142

(22) Filed: Mar. 18, 2022

(65) Prior Publication Data

US 2022/0207789 A1 Jun. 30, 2022

Related U.S. Application Data

(63) Continuation of application No. PCT/CN2021/103363, filed on Jun. 30, 2021.

(30) Foreign Application Priority Data

Dec. 9, 2020 (CN) .......................... 202011447866.9

(51) Int. Cl.
*G06T 11/00* (2006.01)
*G06V 10/32* (2022.01)
(Continued)

(52) U.S. Cl.
CPC ............ *G06T 11/001* (2013.01); *G06V 10/32* (2022.01); *G06V 10/40* (2022.01); *H04L 9/0643* (2013.01);
(Continued)

(58) Field of Classification Search
CPC ........ G06T 11/001; G06T 2207/30128; G06V 10/32; G06V 10/40; G06V 10/449;
(Continued)

(56) References Cited

U.S. PATENT DOCUMENTS

2019/0087726 A1* 3/2019 Greenblatt ............... G06N 3/08
2019/0340749 A1* 11/2019 Schwartzer ............ G01N 21/31
(Continued)

*Primary Examiner* — Iriana Cruz
(74) *Attorney, Agent, or Firm* — Scully, Scott, Murphy & Presser, P.C.

(57) ABSTRACT

The present invention discloses a credible fruit traceability method and device based on fruit texture atlas and blockchain. According to the present invention, images of fruit pedicel part and fruit navel part of a single fruit are obtained, and the images are grayed and normalized to be converted into rectangular images; features are extracted from the rectangular images, respectively, and are encoded to obtain a fruit pedicle feature code table and a fruit navel feature code table; the two feature code tables are subjected to a merging operation to obtain a combined bidirectional feature code table, thus forming a unique fruit texture atlas. By processing the fruit texture atlas, the fruit texture atlas information and related information are stored on the blockchain. The user uses the same algorithm to obtain a fruit texture atlas of a fruit to be inspected through a smart terminal, the fruit texture atlas is processed and then is compared with the information on the blockchain for verification, so as to achieve the purpose of credible traceability. The present invention realizes the uniqueness and convenience of fruit identification, solves the problem of infor- (Continued)

mation tampering by evidence storage on the blockchain, and achieves the purpose of credible traceability.

8 Claims, 5 Drawing Sheets

(51) Int. Cl.
*G06V 10/40* (2022.01)
*H04L 9/06* (2006.01)
*H04L 9/00* (2022.01)

(52) U.S. Cl.
CPC ...... *G06T 2207/30128* (2013.01); *H04L 9/50* (2022.05)

(58) Field of Classification Search
CPC ...... G06V 10/762; G06V 20/68; G06V 20/80; H04L 9/0643; H04L 9/50; H04L 9/3247; G06F 18/24; G06F 18/22
See application file for complete search history.

(56) References Cited

U.S. PATENT DOCUMENTS

| | | | |
|---|---|---|---|
| 2020/0279374 A1* | 9/2020 | King | G06V 10/50 |
| 2021/0297272 A1* | 9/2021 | Weng | H04L 63/0421 |
| 2022/0198473 A1* | 6/2022 | Mao | G06N 3/04 |
| 2022/0252568 A1* | 8/2022 | Schwartzer | G06Q 50/02 |
| 2023/0044040 A1* | 2/2023 | Xu | G06V 20/41 |
| 2023/0143130 A1* | 5/2023 | Bhole | G06T 7/0004 |
| | | | 356/326 |

* cited by examiner

Clamping and rotating fruits and capturing images of a fruit pedicle part and a fruit navel part of each fruit to be encoded respectively Graying the images of fruit pedicel part and fruit navel part respectively, and normalizing the images to convert them into a rectangular image of fruit pedicel part and a rectangular image of fruit navel part Extracting features from the rectangular image of fruit pedicel part and the rectangular image of fruit navel part respectively, encoding the features to obtain a fruit pedicel feature code table and a fruit navel feature code table, and performing a merging operation on the fruit pedicel feature code table and the fruit navel feature code table to obtain a combined bidirectional feature code table thereby forming a fruit texture atlas Matching the obtained feature code tables to identify feature information of the fruit texture atlas

FIG. 3

Positioning outer edges of the fruit pedicel part and of a core of the fruit navel part according to a difference between gray levels of the fruit pedicel part and of an external skin in the image of fruit pedicel part and according to a difference between gray levels of the fruit navel part and of the external skin in the image of fruit navel part, and extracting center positions of the fruit pedicel part and the fruit navel part Drawing two concentric circles by taking the extracted center positions of the fruit pedicel part and the fruit navel part as centers of circles and taking predetermined distances R1 and R2 from centers to edges of the fruit pedicel part and of the fruit navel part as radiuses of circles, and extracting a circular ring between the two concentric circles as an area to be processed Normalizing the area to be processed to convert the same into a rectangular image of fruit pedicel part and a rectangular image of fruit navel part

CREDIBLE FRUIT TRACEABILITY METHOD AND DEVICE BASED ON FRUIT TEXTURE ATLAS AND BLOCKCHAIN

TECHNICAL FIELD

The present invention relates to plant feature extraction, identification and blockchain technology, and particularly to information encoding, identification and blockchain tracing technology based on natural fruit textures.

BACKGROUND

As an effective measure of quality management, traceability has been introduced into the food industry since 1980s. The European Union, the United States, Canada, Australia and other countries have successively established traceability systems for agricultural products and foods. In recent years, with the increasing emphasis on food quality and safety in China and the increasing awareness of people for safe consumption, it has become an urgent need to establish a whole-process quality and safety traceability system "from the field to the dining table" according to the characteristics of the supply chain and the actual demands of quality and safety supervision, so as to guarantee the "safety on the tip of the tongue" of people.

For fruits, vegetables, meat, aquatic products and other products, related patents have formed a relatively mature technical system in terms of identification method, information collection and data transmission and the like. The examples will be given below.

Patent for invention under the title of "encoding method and encoding system for vegetable traceability (application number/patent number: 2011101649608) discloses an encoding system for vegetable traceability, and also discloses a corresponding encoding method for vegetable traceability.

Patent for invention under the title of "method and apparatus for animal individual traceability" (application number/patent number: 200910199977.X) discloses steps of: fixing an electronic mark capable of storing an animal mark identification code number on an animal individual assigned with an current code number, converting the current code number into the animal mark identification code number, storing the converted animal mark identification code number in the electronic mark, reading out an international animal code number in the electronic mark for visiting an international and domestic animal information database.

Patent for invention under the title of "method and system for quality and safety management and traceability of aquaculture products in whole process" (application number/patent number: 200610113644.7) provides a method and system for quality and safety management and traceability of aquaculture products. By solidifying a production database that meets pollution-free aquaculture standards, adopting a Hazard Analysis and Critical Control Point (HACCP) system, and applying a whole-process management, from seeding to stocking and from feedstuff feeding to drug using, to the aquaculture products (fish, shrimp, crab and the like), it provides an aquaculture management and traceability solution which is in line with the global unified encoding (EAN/UCC) and supported by automatic barcode identification technology.

These methods use barcodes and RFIDs as identification tags. However, for fruits, if barcode information is attached for encoding, identification and traceability, there will be various difficulties and shortcomings. First of all, the shape of a fruit itself is irregular, thus the attached barcode or RFID tag is easy to fall off, and the irregular surface of the fruit goes against reading the barcode; secondly, labeling on the surface of fruit is liable to pollute the skin thereof, affect the quality thereof, and cause quality and safety problems; furthermore, labeling fruits one by one not only increases the costs of consumables such as labels but also increases the costs of human labors. Moreover, because labels are external attachments, it involves the risk for high-end fruits that the labels may be exchanged by other people, and the same label information does not necessarily indicate the same fruit. Additionally, a fraud may occur in the traceability of related information.

SUMMARY

In order to solve the problems above, the first objective of the present invention is to provide an encoding method of fruit texture atlas information, for generating a fruit texture atlas. The encoding method can take advantages of fruit texture features of a fruit per, constitute an encoding method based on fruit texture features and create an "identify" for each of the fruits.

The second objective of the present invention is to provide an identification method based on fruit texture atlas, which compares a fruit texture atlas of a fruit to be inspected with a fruit texture atlas stored on a server terminal, through a client terminal, thereby achieving identification of a single fruit.

The third objective of the present invention is to provide a credible fruit traceability method based on fruit texture atlas and blockchain, which take advantages of blockchain technology to store a fruit texture atlas on a blockchain, thereby achieving tamper proof of fruit texture atlas data.

The fourth objective of the present invention is to provide a fruit texture atlas generation and blockchain-based upload device for the methods described above.

The objective of the present invention also lies in providing a credible fruit traceability system based on fruit texture atlas and blockchain.

In order to achieve the objectives above, the present invention adopts technical solutions as below.

An encoding method of fruit texture atlas information, characterized in that, the encoding method includes steps of:

A, obtaining an image of fruit pedicel part and an image of fruit navel part, of a fruit to be encoded;

B, graying the image of fruit pedicel part and the image of fruit navel part, respectively, and normalizing the images to transform the images into a rectangular image of fruit pedicel part and a rectangular image of fruit navel part;

C, extracting features from the rectangular image of fruit pedicel part and the rectangular image of fruit navel part, respectively, encoding the features to obtain a fruit pedicel feature code table and a fruit navel feature code table, and performing a merging operation on the fruit pedicel feature code table and the fruit navel feature code table to obtain a combined bidirectional feature code table, thereby forming a fruit texture atlas.

One of the characteristics of the present invention lies in that the natural texture of a fruit is used as a reference, image features are extracted from the natural texture and are encoded. Generally speaking, there are no two fruits with identical texture. Therefore, all the fruits around the world can be encoded with different feature codes merely by controlling the images of fruit pedicel part and fruit navel part to have sufficient resolution, so the technical effects of the present invention lie in accuracy and uniqueness.

The natural texture of the fruit is not easy to tamper with and cannot be copied, and the original texture information can be basically kept even if the shape of the fruit changes with the growth of fruit, so the present invention has the outstanding advantages of anti-counterfeiting and convenient traceability. It is especially suitable for the encoding and identification of fruits with obvious textures, such as watermelon, cantaloupe and apple.

In addition, one of the characteristics of the present invention lies in that, the features of the rectangular image of fruit pedicle part and the rectangular image of fruit naval part are respectively used for image feature encoding to obtain the fruit pedicle feature code table and the fruit naval feature code table, and the combined bidirectional feature code table is obtained by a merging operation to the fruit pedicle feature code table and the fruit naval feature code table. Therefore, when the method of the present invention is used to identify a fruit by matching the feature code tables, the combined bidirectional feature code table can be matched firstly. If the combined bidirectional feature code table is matched with the stored one, it means that the fruit to be identified is completely matched with the fruit stored in the database, thereby achieving quick matching. However, if the skin of the fruit is locally scratched, for example, if the shape or pattern of one of the rectangular image of fruit pedicle part and the rectangular image of fruit navel part is changed, which leads to the mismatch of the combined bidirectional feature code table, it is also possible to identify by using the fruit pedicle feature code table and the fruit navel feature code table, respectively. If only one of the feature code tables is matched and also meets other conditions, it can also be regarded as a successful identification. Therefore, the encoding and identification method of the present invention also has certain fault tolerance, and gives consideration to both of detection efficiency and robustness.

Furthermore, the step of normalizing the images to transform the images into a rectangular image of fruit pedicel part and a rectangular image of fruit navel part includes:

B1, positioning outer edges of the fruit pedicel part and of a core of the fruit navel part according to a difference between gray levels of the fruit pedicel part and of an external skin in the image of fruit pedicel part and according to a difference between gray levels of the fruit navel part and of the external skin in the image of fruit navel part, and extracting center positions of the fruit pedicel part and the fruit navel part;

B2, drawing two concentric circles by taking the extracted center positions of the fruit pedicel part and the fruit navel part as centers of circles and taking predetermined distances R1 and R2 from centers to edges of the fruit pedicel part and of the fruit navel part as radiuses of circles, and extracting a circular ring between the two concentric circles as an area to be processed;

B3, normalizing the area to be processed by:

$I(x(r,\theta),y(r,\theta)) \rightarrow I(r,\theta)$, wherein, $$\begin{cases} x(r, \theta) = (1-r)x_i(\theta) + rx_0(\theta) \\ y(r, \theta) = (1-r)y_i(\theta) + ry_0(\theta) \end{cases},$$

wherein, I (x,y) represents an image of the circular ring; $(r,\theta)$ represents normalized polar coordinates, $r \in [0,1]$, $\theta \in [0°, 360°]$; when r=, it indicates that I $(x(r,\theta),y(r,\theta))$ is a pixel point at an inner edge of the image of the circular ring; when r=1, it indicates that I $(x(r,\theta),y(r,\theta))$ is a pixel point at an outer edge of the image of the circular ring; $(r, \theta)$ of each point $(x_i, y_i)$ in the area to be processed is determined by considering a relationship of the each point with a center point $(x_0, y_0)$, and the image of the circular ring is transformed into a rectangular image $I(r,\theta)$ by taking r and $\theta$ as rectangular coordinates.

Furthermore, a histogram equalization is further performed to the transformed rectangular image of fruit pedicel part and the transformed rectangular image of fruit navel part, respectively, to enhance the rectangular images, thereby obtaining a clearer texture; performing a histogram equalization is expressed as:

$$S(r_k) = T(r_k) = \frac{1}{N}\sum_{i=0}^{k} N(r_k),$$

wherein N is a total number of pixels of the rectangular image to be enhanced, $N(r_k)$ is the number of pixels with a gray level of $r_k$, k is a gray level number $T(r_k)$ is a transfer function for the gray level of $r_k$, and $S(r_k)$ is a transformed gray level.

Furthermore, the step of extracting features from the rectangular image of fruit pedicel part and the rectangular image of fruit navel part respectively and encoding the features to obtain a fruit pedicel feature code table and a fruit navel feature code table includes:

C1. firstly, extracting an average energy value µ and a variance σ of each channel by using Haar wavelet transform and performing a K-means clustering to obtain an image of the circular ring of a small sample set;

C2, extracting texture information of the image of the circular ring by using two-dimensional Gabor filtering to obtain a corresponding texture feature parameter; wherein an expression of the two-dimensional Gabor filtering is:

$$G(x, y) = \exp\left(-\frac{x_1^2 + y_1^2}{2\sigma^2}\right)\exp\left(i2\pi\frac{x_1}{\lambda}\right),$$

Wherein, $x_1 = x \cos \theta + y \sin \theta$, $y_1 = -x \sin \theta + y \cos \theta$; $\lambda$ is a wavelength specified in pixels, $\lambda$ represents a wavelength parameter of a cosine function in a Gabor kernel function and is specified in pixels, $\lambda$ usually is greater than or equal to 2, but is not allowed to be greater than one fifth of a size of the inputted image; $\theta$ represents a direction, which specifies a direction of parallel stripes of the Gabor function, and is valued between 0 and 360 degrees. Moreover, σ represents a standard deviation of a Gaussian factor of the Gabor function.

C3, after obtaining the texture feature parameter, determining a positivity or a negativity of a real part and an imaginary part of a coefficient of the texture feature parameter to perform quantitative encoding, including:

$$h_{Re} = \begin{cases} 1 & \text{Re}\{ifft(G(f) \cdot fft(I(r)))\} \geq 0 \\ 0 & \text{Re}\{ifft(G(f) \cdot fft(I(t)))\} < 0 \end{cases}$$

$(r = 1, 2, 3, \ldots, N)$,

-continued $$h_{Im} = \begin{cases} 1 & \text{Re}\{ifft(G(f) \cdot fft(I(r)))\} > 0 \\ 0 & \text{Re}\{ifft(G(f) \cdot fft(I(t)))\} < 0 \end{cases}$$

$(r = 1, 2, 3, \ldots, N),$ wherein $h_{Re}$ and $h_{Im}$ represent the real part and the imaginary part of the texture feature parameter obtained through filtering, respectively, fft represents a Fourier transform, ifft represents a Fourier inversion; wherein G(f) represents a filter corresponding to G(x, y) mentioned above; I(r) represents the normalized image.

Furthermore, the step of performing a merging operation on the fruit pedicel feature code table and the fruit navel feature code table to obtain a combined bidirectional feature code table includes:

C4, $T = T_A \cup T_B = \{X_{(i,j)} | X_{(i,j)} \in T_A \text{ or } X_{(i,j)} \in T_B\}$, wherein T represents the combined bidirectional feature code table, $T_A$ and $T_B$ represent the fruit pedicel feature code table and the fruit navel feature code table, respectively, and X(i, j) is a value corresponding to row i and column j in the bidirectional feature code table.

In order to achieve the second objective of the present invention, the present invention further provides an identification method based on fruit texture atlas. The identification method obtains a fruit texture atlas of a reference fruit by the encoding method described above, and further includes the step of: D, performing an image feature encoding to a fruit to be identified to obtain a feature code table, and matching the obtained feature code table with the feature code table of the fruit texture atlas of the reference fruit so as to identify feature information of the fruit texture atlas.

Furthermore, the step of performing an image feature encoding to a fruit to be identified to obtain a feature code table, and matching the obtained feature code table with a feature code table of the fruit texture atlas of the reference fruit so as to identify feature information of the fruit texture atlas includes:

D1, performing the matching by using a classifier based on Hamming distance (HD), which is calculated by a formula of:

$$HD = \frac{1}{N} \sum_{j=1}^{N} P_j(XOR) Q_j,$$

wherein N is a bit number of texture feature code, XOR represents an exclusive-OR operation, and $P_j$ and $Q_j$ represent a $j^{th}$ bit of texture feature codes P and Q, respectively;

if a determined HD is greater than a predetermined first threshold value, it's judged that the fruit to be identified is different from the reference fruit; if the determined HD is less than the predetermined first threshold value, it's judged that the fruit to be identified is the same fruit with the reference fruit.

Furthermore, the step of performing an image feature encoding to a fruit to be identified to obtain a feature code table, and matching the obtained feature code table with a feature code table of the fruit texture atlas of the reference fruit so as to identify feature information of the fruit texture atlas includes:

identifying the feature information of the fruit texture atlas according to the combined bidirectional feature code table, firstly; if it is judged that the fruit to be identified is the same fruit with the reference fruit, the identification is ended; otherwise, if a difference between the determined HD and the predetermined first threshold value is less than a predetermined difference value, the feature information is further identified according to the fruit pedicle feature code table and the fruit naval feature code table extracted from the bidirectional feature code table, respectively; and if one of the determined HDs obtained according to the fruit pedicle feature code table and the fruit naval feature code table is less than the predetermined first threshold value, it is only necessary to determine the other one of the determined HDs being less than a predetermined second threshold value to judge that the fruit to be identified is the same fruit with the reference fruit, and the identification is ended.

In order to achieve the third objective of the present invention, the present invention further provides a credible fruit traceability method based on fruit texture atlas and blockchain, which includes the steps of obtaining a fruit texture atlas by using the encoding method described above, and further includes steps of:

E, uploading onto blockchain: signing the fruit texture atlas through Hash function encryption, uploading hash values onto a blockchain for evidence storage, and obtaining a block number of the blockchain where the fruit texture atlas is located;

F, storing the block number and fruit texture atlas information corresponding to the block number on a local application server.

Specifically, the step E includes:

E1, a process prior to uploading, including: performing a Hash function encryption to the fruit texture atlas for one time to obtain a string of hash values bound with the fruit texture atlas, signing the hash values with asymmetric encryption algorithm, and confirming that a sender holds a corresponding private key based on a public key and signature information so as to transform the fruit texture atlas into a blockchain readable mode and meanwhile bind an identity of the sender with information sent by the sender through the signature information; and E2, an uploading process, including: sending processed data to nodes of the blockchain to form a blockchain transaction and enter an uploading stage; after receiving the blockchain transaction, broadcasting, by each of the nodes of the blockchain, the blockchain transaction as received to other nodes firstly to form a unified transaction pool, in which transaction data contains hash values of packaged transactions in a current block and the packaged transactions need to be sorted according to a unified order; after confirming a block header and the hash values, calculating block hash values and forming a chain by connecting a previous block hash value to a current block hash value, so as to complete the uploading process.

Further, the credible fruit traceability method based on fruit texture atlas and blockchain further includes: performing a Hash function encryption to traceability information of the reference fruit, uploading hash values onto the blockchain for evidence storage one by one to obtain a corresponding block number, and updating the block number and the traceability information onto the local application server in one-to-one correspondence. The traceability information includes fruit variety information, planting information, cold chain logistics information and so on. The blockchain-based upload method of the traceability information may refer to that described above.

Further, the credible fruit traceability method based on fruit texture atlas and blockchain further includes the step of:

G, traceability query, including: obtaining a fruit texture atlas of a fruit to be inspected by the encoding method described above, matching the fruit texture atlas of the fruit to be inspected with a corresponding fruit texture atlas of a reference fruit on the local application server by the identification method described above to obtain a block number corresponding to the reference fruit, obtaining hash values of the fruit texture atlas of the reference fruit stored on the blockchain through the block number, performing a Hash function encryption to the fruit texture atlas of the reference fruit stored on the local application server to obtain hash values of a local fruit texture atlas, and comparing the hash values of the fruit texture atlas of the reference fruit stored on the blockchain with the hash values of the local fruit texture atlas to determine a consistency there-between.

Specifically, the traceability query obtains the fruit texture atlas of the fruit to be inspected by the encoding method described above; obtains traceability information, a block number of the fruit texture atlas and a block number of the traceability information of the fruit to be inspected from the local application server through the fruit texture atlas of the fruit to be inspected; performs a Hash function encryption to the fruit texture atlas and the traceability information of the fruit to be inspected, respectively, to obtain hash values, and compares the obtained hash values with hash values stored on the blockchain obtained through the block number of the fruit to be inspected to determine a consistency there-between, so as to judge whether the fruit to be inspected is a fruit corresponding to the fruit texture atlas stored on the blockchain, and to judge whether the traceability information has been tampered with.

Consumers can utilize a device with camera function such as smart phone or other smart devices to perform fruit traceability by using the traceability method described above through taking picture(s) of a pedicel part and/or a naval part of the fruit.

In order to achieve the fourth objective of the present invention, the present invention further provides a fruit texture atlas generation and blockchain-based upload device for the traceability method described above, the device includes a fruit texture atlas generation module and a blockchain-based upload module, wherein The fruit texture atlas generation module includes an image acquisition device and a fruit texture atlas feature code generation device; the image acquisition device is used for capturing images of a fruit pedicle part and a fruit navel part of each fruit to be encoded, respectively; the fruit texture atlas feature code generation device is used for graying the images of fruit pedicel part and fruit navel part respectively, normalizing the images to convert the images into a rectangular image of fruit pedicel part and a rectangular image of fruit navel part, extracting features from the rectangular image of fruit pedicel part and the rectangular image of fruit navel part respectively, encoding the features to obtain a fruit pedicel feature code table and a fruit navel feature code table, performing a merging operation on the fruit pedicel feature code table and the fruit navel feature code table to obtain a combined bidirectional feature code table; and The blockchain-based upload module is used for signing fruit texture atlas data obtained by the fruit texture atlas generation module through Hash function encryption, uploading hash values onto a blockchain for evidence storage, and obtaining a block number of the blockchain where the fruit texture atlas is located; and used for signing traceability information through Hash function encryption, uploading hash values onto the blockchain for evidence storage, and obtaining a block number of the traceability information.

Further, the fruit texture atlas generation and blockchain-based upload device further includes a local application server, the local application server is used for storing the fruit texture atlas, the traceability information and corresponding block numbers of the fruit.

Further, the image acquisition device includes a flexible clamping unit, a synchronous rotation unit and an image acquisition unit, wherein, The flexible clamping unit has a bidirectional telescopic function and is used for clamping both sides of each of different fruits depending on sizes and shapes thereof;

The synchronous rotation unit is rotatable by 180 degrees, and is used for rotating the fruit being clamped so as to obtain one image of the fruit pedicel part and one image of the fruit navel part for each fruit; and The image acquisition unit is used for triggering image acquisition at regular intervals, and is used for capturing one image of the pedicle part and one image of the naval part for each fruit to be encoded.

Further, the fruit texture atlas generation and blockchain-based upload device further includes a traceability tool provided with a camera module, a calculation module and a communication module. The traceability tool is used for taking photos of fruit pedicle part or fruit navel part, obtaining a fruit texture atlas through image processing, verifying the authenticity of product through comparison, and realizing product traceability.

The objective of the present invention also lies in providing a credible fruit traceability system based on fruit texture atlas and blockchain. The system includes a fruit texture atlas generation module, a blockchain-based upload module, a blockchain server, a local application server and a client terminal. The fruit texture atlas generation module obtains an image of a surface of the fruit (at the fruit pedicle part or fruit navel part), and generates a fruit texture atlas through edge positioning, circle extraction, normalization processing, image enhancement, feature extraction, feature encoding, code table merging and other processes. The blockchain-based upload module signs the generated fruit texture atlas through Hash function encryption and uploads hash values onto a blockchain for evidence storage by a process prior to uploading and an uploading process, and obtains a block number of the blockchain where the fruit texture atlas is located; and signs traceability information through Hash function encryption, uploads hash values onto a blockchain for evidence storage, and obtains a block number of the traceability information. The blockchain server is used for storing hash values of the fruit texture atlas and hash values of the traceability information. The client terminal is used for taking photos of the fruit pedicel part or the fruit navel part, obtaining the fruit texture atlas through image processing, performing Hash function encryption to the fruit texture atlas, and comparing the hash values of the fruit texture atlas with the hash values stored on the blockchain and obtained through the block number to verify the authenticity of the product and realize the product traceability.

Optionally, the fruit texture atlas generation module and the blockchain-based upload module in the system described above are the same with the corresponding components of the fruit texture atlas generation and blockchain-based upload device described above. The client terminal may be a smart phone or other smart devices with a camera module, a calculation module and a communication module.

In the present invention, the blockchain server may adopt a public blockchain or a consortium blockchain.

The present invention has the following technical effects:

I. It achieves uniqueness and convenience of fruit identification by utilizing appearance texture characteristics of fruit per se to establish atlas feature information. The fruit texture information is not easy to lose and is difficult to tamper with, which can fully guarantee the accuracy in the process of fruit identification and traceability.

II. It improves the accuracy of identification by establishing a combined bidirectional feature code table based on a fruit pedicel feature code table and a fruit navel feature code table. Firstly, identifying the feature information of the fruit texture atlas according to the combined bidirectional feature code table; if it is judged that the feature information belongs to the same fruit, the identification is ended; otherwise, if a difference between a Hamming distance and a first threshold value is less than a predetermined difference value, the feature information of the fruit texture atlas is further identified according to the fruit pedicle feature code table and the fruit navel feature code table, respectively, and it's further judged whether the feature information belongs to the same fruit or not by comprehensively considering the identification results. Therefore, the accuracy is improved, and meanwhile certain error correction ability is ensured.

III. It improves the accuracy of texture extraction and encoding efficiency by adopting a two-dimensional Gabor function whose characteristic parameters include frequency and direction.

According to the present invention, a feature atlas is established by utilizing appearance texture features of fruits per se so that the uniqueness and convenience of fruit identification are achieved, and the first importance (identification) of traceability is credible; the problem of information tampering is further solved by sending fruit texture atlas information to a blockchain, and the second importance (information) of traceability is credible; the purpose of credible traceability is achieved and meanwhile the storage space of the blockchain is saved by storing the fruit texture atlas information and the business information on the blockchain and on a local memory, respectively, and by blockchain-based upload of hash values.

DETAILED DESCRIPTION

Hereinafter, the present invention will be described in details with reference to the drawings.

Detailed exemplary embodiments are disclosed below. However, the specific structures and functional details disclosed herein are only for the purpose of describing the exemplary embodiments.

However, it should be understood that the present invention is not limited to the specific exemplary embodiments as disclosed but covers all modifications, equivalents and alternatives falling within the scope of the present disclosure. In the description of all the drawings, the same reference numerals refer to the same elements.

Referring to the drawings, the structures, proportions, sizes and the like shown in the drawings accompanying the specification are only used to cooperate with the contents disclosed in this specification for those familiar with this technology to understand and read, and are not used to limit the applicable conditions of the present invention, so they are of no technical significance. Any structural modification, change of proportional relationship or adjustment of sizes without affecting the effects and objectives that can be achieved by the present invention should also fall within the technical contents disclosed in the present invention. At the same time, the position-limiting terms quoted in this specification are only for the convenience of description and clarity, and are not used to limit the implementable scope of the present invention. The change or adjustment of the relative relationship without substantial change of technical contents is also regarded as the implementable scope of the present invention.

At the same time, it should be understood that the term "and/or" as used herein includes any and all combinations of one or more related items as listed. In addition, it should be understood that when a component or unit is referred to as being "connected" or "coupled" to another component or unit, it may be directly connected or coupled to other components or units, or there may be intermediate components or units. In addition, other words used to describe the relationship between components or units should be understood in the same way (for example, "between" vs "directly between", "adjacent" vs "directly adjacent", etc.).

The First Embodiment: Encoding of Fruit Texture Atlas Information

The specific embodiment of the present invention includes an encoding method based on fruit texture atlas information, which includes the following steps:

A, clamping and rotating fruits, and capturing images of a fruit pedicle part and a fruit navel part of each fruit to be encoded, respectively;

B, graying the images of fruit pedicel part and fruit navel part, respectively, and normalizing the images to convert them into a rectangular image of fruit pedicel part and a rectangular image of fruit navel part;

C, extracting features from the rectangular image of fruit pedicel part and the rectangular image of fruit navel part, respectively, encoding the features to obtain a fruit pedicel feature code table and a fruit navel feature code table, and performing a merging operation on the fruit pedicel feature code table and the fruit navel feature code table to obtain a combined bidirectional feature code table, thereby forming a fruit texture atlas. The fruit texture atlas can further include the fruit pedicel feature code table and/or the fruit navel feature code table.

Figure 4:
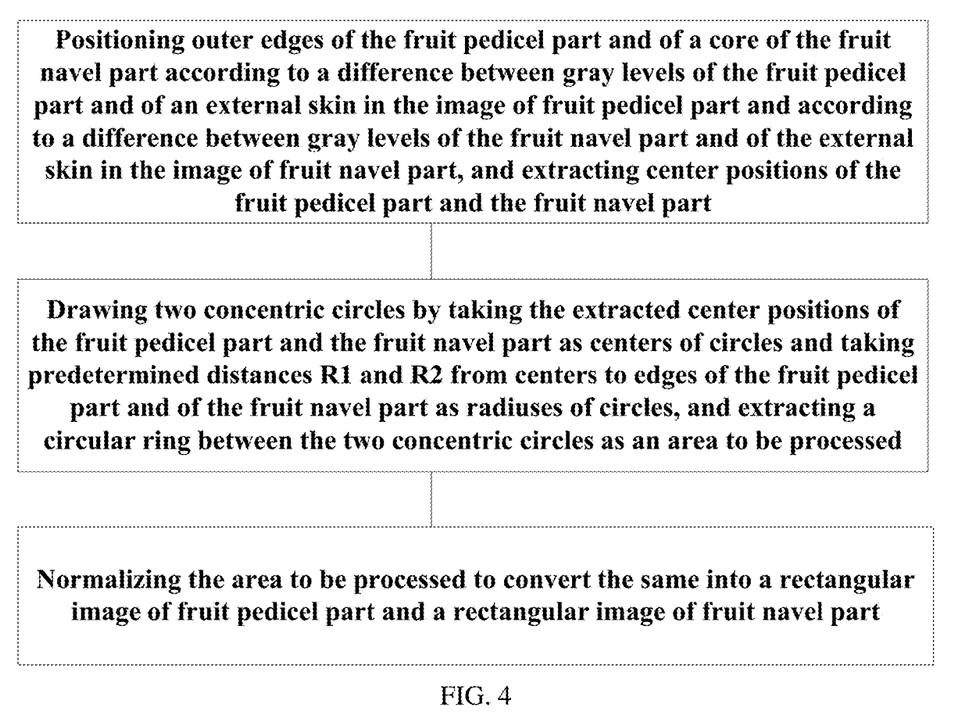
FIG. 4 is a partial flow chart of an encoding and identification method based on fruit texture atlas information according to a specific embodiment of the present invention.

In addition, FIG. 4 is a partial flow chart of an encoding and identification method based on fruit texture atlas information according to a specific embodiment of the present invention. As shown in the figure, in the specific embodiment of the present invention, the step of normalizing the images to convert them into a rectangular image of fruit pedicel part and a rectangular image of fruit navel part includes:

B1, positioning outer edges of the fruit pedicel part and of a core of the fruit navel part according to a difference between gray levels of the fruit pedicel part and of an external skin in the image of fruit pedicel part and according to a difference between gray levels of the fruit navel part and of the external skin in the image of fruit navel part, and extracting center positions of the fruit pedicel part and the fruit navel part;

B2, drawing two concentric circles by taking the extracted center positions of the fruit pedicel part and the fruit navel part as centers of circles and taking predetermined distances R1 and R2 from centers to edges of the fruit pedicel part and of the fruit navel part as radiuses of circles, and extracting a circular ring between the two concentric circles as an area to be processed;

B3, normalizing the area to be processed as:

$$I(x(r,\theta),y(r,\theta)) \rightarrow I(r,\theta),$$

wherein, $$\begin{cases} x(r, \theta) = (1-r)x_i(\theta) + rx_0(\theta) \\ y(r, \theta) = (1-r)y_i(\theta) + ry_0(\theta) \end{cases},$$

wherein, I (x,y) represents an image of the circular ring; (r, θ) represents normalized polar coordinates, r∈[0,1], θ∈[0°,360°]; when r=0, it indicates that I (x(r,θ,y(r,θ)) is a pixel point at an inner edge of the image of the circular ring; when r=1, it indicates that I (x(r,θ,y(r,θ)) is a pixel point at an outer edge of the image of the circular ring; (r,θ) of each point ($x_i$, $y_i$) in the area to be processed is determined by considering a relationship of the each point with a center point ($x_0$, $y_0$), and the image of the circular ring is transformed into a rectangular image I(r,θ) by taking r and θ as rectangular coordinates.

After obtaining the images of fruit pedicel part and fruit navel part, positioning the outer edges of the fruit pedicel part and of the core of the fruit navel part, and extracting the center positions of the fruit pedicel part and the fruit navel part according to the difference between gray levels of the fruit pedicel part and of the external skin and the difference between gray levels of the fruit navel part and of the external skin. For example, positioning the outer edges of the fruit pedicel part and of the core of the fruit navel part by using a threshold method, a mathematical morphology operation and a Hough transform. Because the outer edges of the fruit pedicel part and of the core of the fruit navel part are generally in a round shape, the centers of circles of the fruit pedicel part and of the core of the fruit navel part can be determined just by simple mathematical calculations.

The predetermined distances R1 and R2 are selected according to needs. Firstly, the distance R1 is determined. When R1 is relatively small, the fruit textures are easy to be gathered rather than separated; when R1 is relatively great, the workload of calculation and encoding may be huge. After R1 is determined, R2 can be selected as a certain multiple of R1, such as 1.2~1.8 times of R1. Then, the circular ring between two concentric circles is extracted as the area to be processed;

The normalization process, in fact, is a transformation mapping from circular coordinates to rectangular coordinates. After the transformation mapping, it can be found that, for example, radial textures of a watermelon basically form stripped textures in a rectangular coordinate system.

In addition, in the specific embodiment of the present invention, a histogram equalization is further performed to enhance the transformed rectangular images of the fruit pedicel part and fruit navel part, respectively, so as to obtain clearer textures. The histogram equalization is as follows:

$$S(r_k) = T(r_k) = \frac{1}{N}\sum_{i=0}^{k} N(r_k),$$

wherein N is a total number of pixels of the rectangular image to be enhanced, $N(r_k)$ is the number of pixels with a gray level of $r_k$, k is a gray level number, $T(r_k)$ is a transfer function for the gray level of $r_k$, and $S(r_k)$ is a transformed gray level.

In order to extract graphic features of the rectangular image of fruit pedicel part and the rectangular image of fruit navel part conveniently, the present invention enhances the rectangular images firstly. The reason for adopting the histogram equalization is that, in an image, gray levels are often concentrated. For example, components of the histogram in a dark image are concentrated at the end with lower gray levels, while components of the histogram in a bright image tend to be concentrated at the end with higher gray levels. Uneven distribution of gray levels will lead to low discrimination. When uniform encoding is used, the encoding accuracy will be lower. To this end, histogram equalization can be used to make the distribution of gray levels in the image more uniform. If the gray histogram of an image covers almost the whole range of gray values and if the overall distribution of gray values is close to uniform distribution except for that the number of certain gray values is notable, the image possesses a larger dynamic range of gray values and a higher contrast, and the details of the image are richer. A transfer function can be obtained merely by relying on the histogram information of an inputted image, and the inputted image can achieve the above effects by using this transfer function. Therefore, in the specific embodiment of the present invention, the above histogram equalization is adopted as a pre-operation before the image feature extraction.

In addition, in the specific embodiment of the present invention, the step of extracting features from the rectangular image of fruit pedicle part and the rectangular image of fruit naval part respectively and encoding the features to obtain a fruit pedicle feature code table and a fruit naval feature code table includes:

C1. extracting an average energy value μ and a variance σ of each channel by Haar wavelet transform, and performing a clustering process such as K-means clustering to obtain an image of circular ring of a small sample set;

C2, extracting texture information of the image of circular ring by using two-dimensional Gabor filtering to obtain a corresponding texture feature parameter; wherein an expression of the two-dimensional Gabor filtering is:

$$G(x, y) = \exp\left(-\frac{x_1^2 + y_1^2}{2\sigma^2}\right)\exp\left(i2\pi\frac{x_1}{\lambda}\right),$$

wherein $x_1$=x cos θ+y sin θ, $y_1$=−x sin θ+y cos θ, λ is a wavelength specified in pixels, for example, the value of the wavelength usually is equal to or greater than 2 but not greater than one fifth of a size of the inputted image, and θ represents a direction;

C3. after obtaining the texture feature parameter, determining a positivity or a negativity of a real part and an imaginary part of a coefficient of the texture feature parameter to perform quantitative encoding, specifically, $$h_{Re} = \begin{cases} 1 & \text{Re}\{ifft(G(f) \cdot fft(I(r)))\} \geq 0 \\ 0 & \text{Re}\{ifft(G(f) \cdot fft(I(t)))\} < 0 \end{cases},$$

$$(r = 1, 2, 3, \ldots, N),$$

$$h_{Im} = \begin{cases} 1 & \text{Re}\{ifft(G(f) \cdot fft(I(r)))\} \geq 0 \\ 0 & \text{Re}\{ifft(G(f) \cdot fft(I(t)))\} < 0 \end{cases},$$

$$(r = 1, 2, 3, \ldots, N),$$

wherein, $h_{Re}$ and $h_{Im}$ represent the real part and imaginary part of the texture feature parameter obtained through filtering, respectively; fft represents a Fourier transform; and ifft represents a Fourier inversion.

In the specific embodiment of the present invention, a two-dimensional Gabor filter is especially used to extract texture feature parameters of the image. It is found through verification that the two-dimensional (2D) Gabor filter formed by Gabor function has the characteristics of optimal localization in both spatial domain and frequency domain, so it can well describe the local structure information corresponding to spatial frequency (scale), spatial position and direction selectivity. The representation of frequency and direction of the 2D Gabor filter is close to that of human visual system, so it can be used for representation and description of textures. In fact, in the spatial domain, one 2D Gabor filter is a product of a sinusoidal plane wave and a Gaussian kernel function.

In a one-dimensional mode, the Gabor transform represents an optimization method of time-frequency domain analysis, while in a two-dimensional mode, the Gabor transform is a method of spatial-frequency domain analysis. A window function determines a locality of an image in the spatial domain, so the spatial domain information of different positions can be obtained by moving the center of the window. Therefore, as compared with one-dimensional Gabor filter used in some cases, the present invention adopts a two-dimensional Gabor filter which can generate feature information of a two-dimensional space. Compared with one-dimensional image signal, the feature code table as obtained has a large amount of information and a high degree of discrimination, and is in line with the characteristics of natural textures of fruits that grow naturally.

In addition, in the specific embodiment of the present invention, the step of performing a merging operation on the fruit pedicel feature code table and the fruit navel feature code table to obtain a combined bidirectional feature code table may be expressed as follows:

C4, $T = T_A \cup T_B = \{X_{(i,j)} | X_{(i,j)} \in T_A \text{ or } X_{(i,j)} \in T_B\}$, wherein T represents the combined bidirectional feature code table, $T_A$ and $T_B$ represent the fruit pedicel feature code table and the fruit navel feature code table, respectively, and X(i, j) is a value corresponding to row i and column j in the bidirectional feature code table.

The Second Embodiment

Identification Method Based on Fruit Texture Atlas

Figure 2:
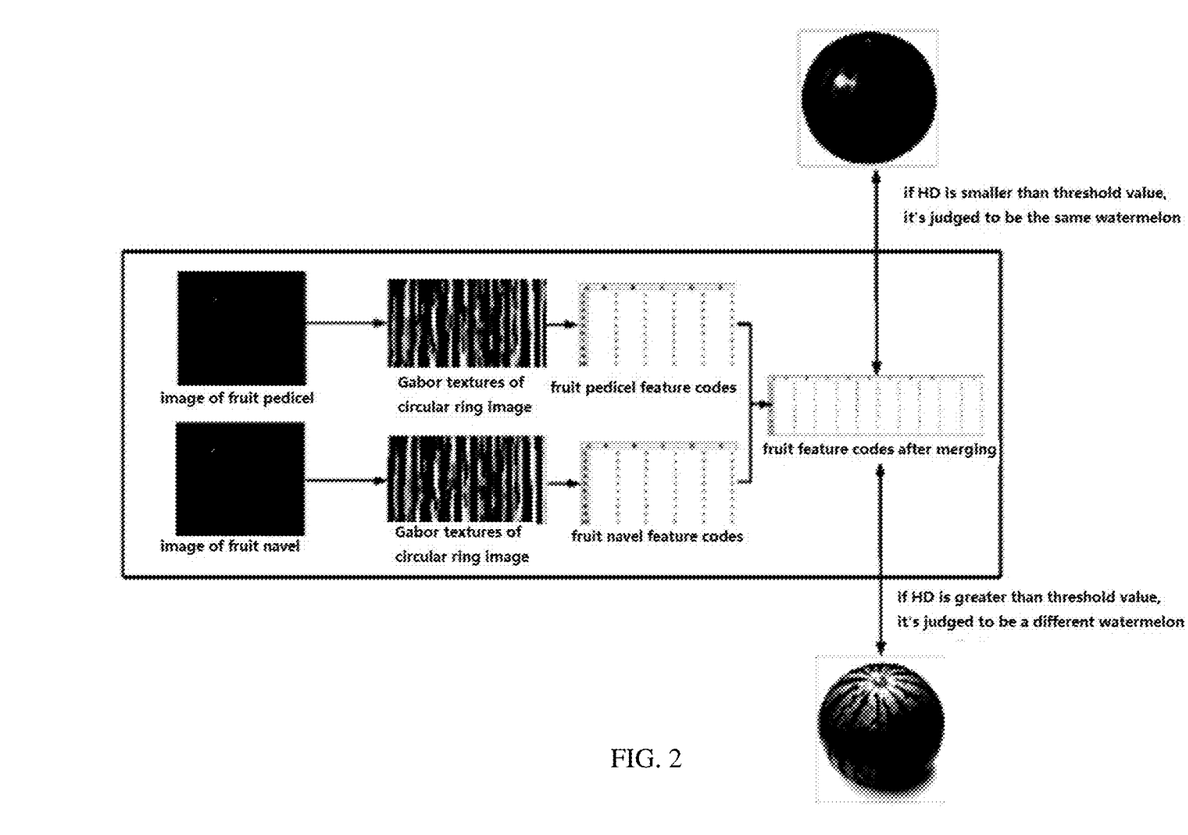
FIG. 2 is a schematic diagram illustrating the principle of an encoding and identification method based on fruit texture atlas information according to a specific embodiment of the present invention.
Figure 3:
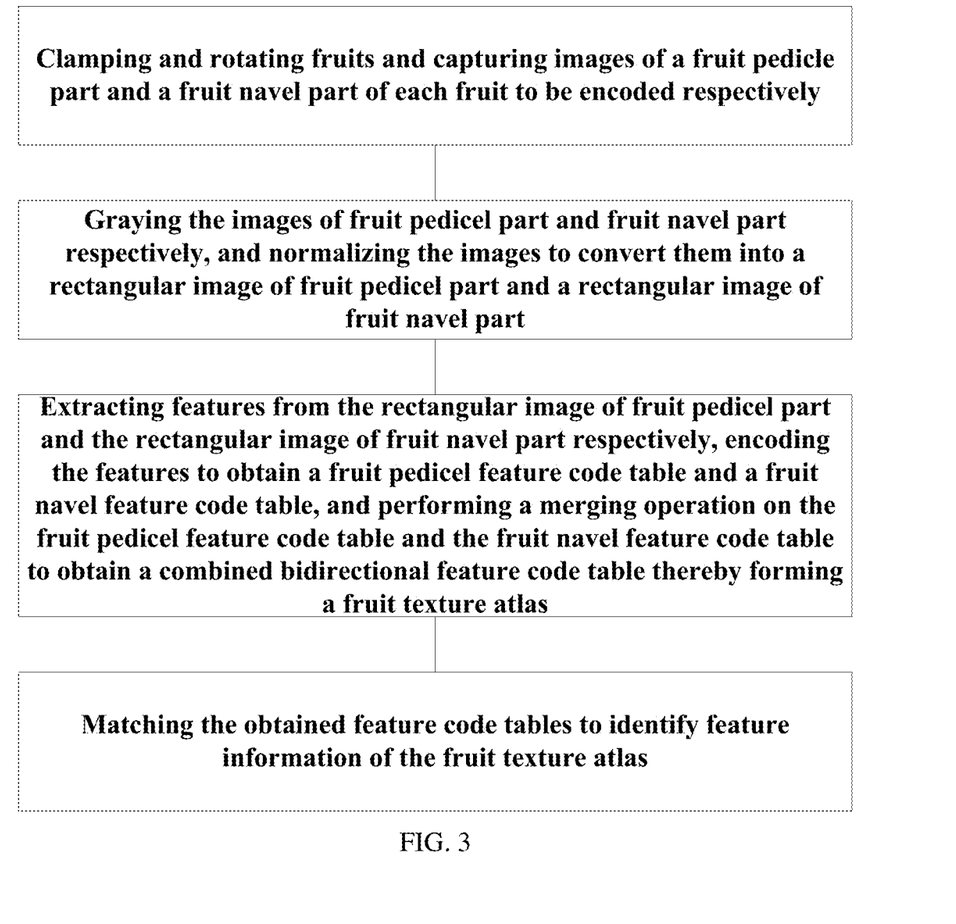
FIG. 3 is a flow chart of an encoding and identification method based on fruit texture atlas information according to a specific embodiment of the present invention.

FIGS. 2 and 3 are schematic diagrams illustrating a working principle and a flow chart of this embodiment, respectively. In this embodiment, the fruit texture atlas of each fruit has been obtained and the information of fruit texture atlas has been stored on a server, by using the method of the first embodiment. A client terminal captures images of pedicel part and naval part of a fruit to be identified, encodes features of the images by the same method described above, and matches the feature code tables as obtained with the feature code tables of a reference fruit as stored. The identification of feature information of the fruit texture atlas includes the following steps:

D1, performing the matching by using a classifier based on Hamming distance (HD), which is calculated by a formula of:

$$HD = \frac{1}{N} \sum_{j=1}^{N} P_j(XOR)Q_j,$$

wherein, N is a bit number of texture feature code, XOR represents an exclusive-OR operation, and $P_j$ and $Q_j$ represent a $j^{th}$ bit of the texture feature codes P and Q, respectively;

if a determined HD is greater than a predetermined first threshold value, it's judged that the fruit to be identified is a fruit different from the reference fruit; if the determined HD is less than the predetermined first threshold value, it's judged that the fruit to be identified is the same fruit with the reference fruit.

The first threshold value can be selected according to experiences, or can be determined by machine learning. For example, by encoding and identifying a certain number of fruits, adjusting the first threshold value and checking the accuracy under different threshold values, so as to select the optimal solution of the first threshold value.

In the specific embodiment of the present invention, the aforementioned encoding steps are performed to the fruit to be identified, firstly, to obtain the combined bidirectional feature code table, the fruit pedicel feature code table and the fruit navel feature code table, which are matched and compared with the corresponding bidirectional feature code table, fruit pedicel feature code table and fruit navel feature code table as stored, respectively, so as to carry out the fruit identification operation.

In addition, in the specific embodiment of the present invention, the process of encoding features of the images of the fruit to be identified, and matching the feature code tables as obtained with the feature code tables as stored to identify the feature information of the fruit texture atlas includes the following steps:

Firstly, identifying the feature information of the fruit texture atlas according to the combined bidirectional feature code table. If it is judged that the fruit to be identified is the same fruit with the reference fruit, the identification is ended; otherwise, if the difference between the determined HD and the first threshold value is less than a predetermined difference value, the identification of feature information of the fruit texture atlas is further carried out according to the fruit pedicle feature code table and the fruit naval feature code table, respectively; if one of the determined HDs obtained according to the fruit pedicle feature code table and the fruit naval feature code table is less than the predetermined first threshold value, it is only necessary to determine the other HD being less than a predetermined second threshold value to judge that the fruit to be identified is the same fruit with the reference fruit, and the identification is ended.

As mentioned above, one of obvious advantages of the present invention lies in possessing both accuracy and fault tolerance. When the combined bidirectional feature code table is used to identify the feature information of the fruit texture atlas, the fruit can be accurately identified. However, when the fruit is damaged to some extent to result in that the HD determined according to the bidirectional feature code table is greater than but also close to the predetermined first threshold value, for example, when the difference between the determined HD and the first threshold value is less than a predetermined difference, i.e., when the HD determined according to the bidirectional feature code table is greater than the predetermined first threshold value by a small and limited value, the feature information of the fruit texture atlas is further identified according to the fruit pedicle feature code table and the fruit navel feature code table, respectively. If one of the determined HDs obtained according to the fruit pedicle feature code table and the fruit navel feature code table is less than the predetermined first threshold value, it is only necessary to determine the other HD being less than the second predetermined threshold value to judge that the fruit to be identified is the same fruit with the reference fruit, and then the identification is ended. The predetermined second threshold value is greater than the first predetermined threshold value, which indicates that when one of the pedicel part and the navel part is identified, the identification requirements of the other one can be appropriately lowered.

Therefore, when the method of the present invention identifies fruits by matching the feature code tables, the combined bidirectional feature code table can be matched firstly. If the combined bidirectional feature code table is matched with the stored one, it means that the fruit to be identified is completely matched with the fruit stored in the database, thereby achieving quick matching. However, if the skin of the fruit is locally scratched, for example, if the shape or pattern of one of the rectangular image of fruit pedicle part and the rectangular image of fruit navel part is changed, which leads to the mismatch of the combined bidirectional feature code table, it is also possible to identify by using the fruit pedicle feature code table and the fruit navel feature code table, respectively. If only one of the feature code tables is matched and also meets other conditions, it can also be regarded as a successful identification. Therefore, the encoding and identification method of the present invention also has certain fault tolerance, and gives considerations to both of detection efficiency and robustness.

The Third Embodiment

Encoding and Identification Device Based on Fruit Texture Atlas Information

Figure 1:
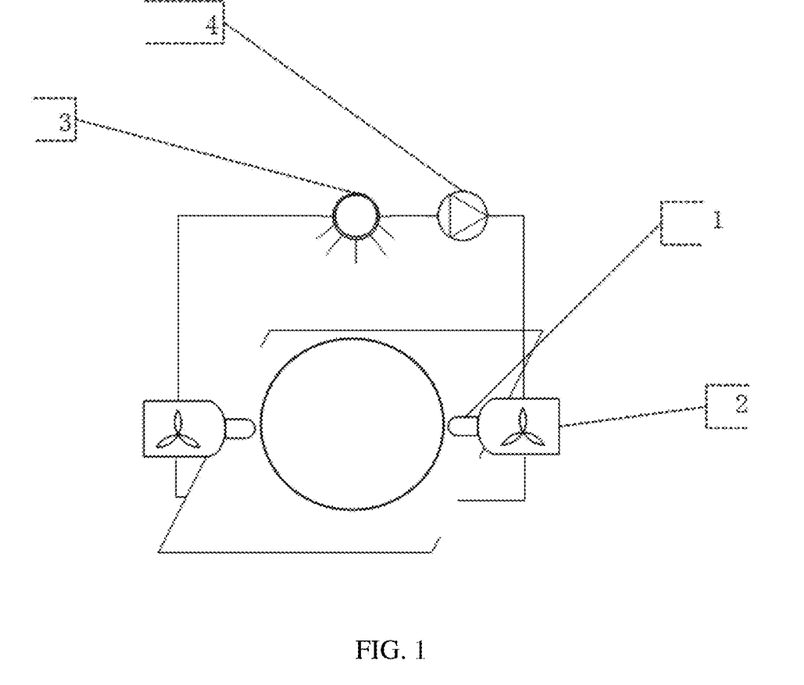
FIG. 1 is a schematic diagram illustrating a working principle of an encoding and identification device based on fruit texture atlas information according to a specific embodiment of the present invention.

FIG. 1 is a schematic diagram of a working principle of an encoding and identification device based on fruit texture atlas information according to a specific embodiment of the present invention. As shown in the figure, the specific embodiment of the present invention further includes an encoding and identification device based on fruit texture atlas information, which is suitable for the encoding and identification method based on fruit texture atlas information in the specific embodiment of the present invention. The encoding and identification device based on fruit texture atlas information includes an image acquisition device, a fruit texture atlas feature code generation device 4 and a fruit texture atlas feature information identification device, wherein, The image acquisition device is used for clamping and rotating fruits, and capturing images of a fruit pedicle part and a fruit navel part of each fruit to be encoded, respectively;

The fruit texture atlas feature code generation device 4 is used for graying the images of fruit pedicel part and fruit navel part respectively, normalizing the images to convert them into a rectangular image of fruit pedicel part and a rectangular image of fruit navel part, extracting features from the rectangular image of fruit pedicel part and the rectangular image of fruit navel part respectively, encoding the features to obtain a fruit pedicel feature code table and a fruit navel feature code table, performing a merging operation on the fruit pedicel feature code table and the fruit navel feature code table to obtain a combined bidirectional feature code table, and storing the bidirectional feature code table, the fruit pedicel feature code table and the fruit navel feature code table;

The fruit texture atlas feature information identification device is used for encoding the features of the images of the fruit to be identified, and matching the feature code tables as obtained with the feature code table as stored so as to identity the feature information of the fruit texture atlas.

In addition, in the specific embodiment of the present invention, the image acquisition device includes a flexible clamping unit 1, a synchronous rotation unit 2 and an image acquisition unit 3, wherein, The flexible clamping unit has bidirectional telescopic function and is used for clamping both sides of each of different fruits according to their sizes and shapes;

The synchronous rotation unit can realize 180-degree rotation, and is used for rotating the clamped fruits, so as to obtain one image of the fruit pedicel part and one image of the fruit navel part for each fruit;

The image acquisition unit is used for triggering image acquisition at regular intervals, and is used for capturing one image of the fruit pedicle part and one image of the fruit naval part for each fruit to be encoded.

In addition, in the specific embodiment of the present invention, the fruit texture atlas feature information identification device is used for encoding the features of the images of the fruit to be identified, and matching the feature code tables as obtained with the feature code tables as stored. The identification of feature information of the fruit texture atlas includes:

Firstly, the feature information of the fruit texture atlas is identified according to the combined bidirectional feature code table; if it is judged that the fruit to be identified is the same fruit with the reference fruit, the identification is ended; otherwise, if predetermined conditions are satisfied, the feature information of the fruit texture atlas is identified according to the fruit pedicle feature code table and the fruit navel feature code table, respectively, and whether the fruit to be identified is the same fruit with the reference fruit is further judged by comprehensively considering the identification results.

Therefore, the identification of the feature information of the fruit texture atlas can further determine whether the fruit to be identified is the same fruit with the reference fruit by considering the identification results comprehensively.

The Fourth Embodiment

Credible Fruit Traceability Method Based on Fruit Texture Atlas and Blockchain

This embodiment provides a credible fruit traceability method based on fruit texture atlas and blockchain, including: obtaining a fruit texture atlas of a reference fruit by the method of the first embodiment, and the following steps:

E, uploading onto blockchain: signing the fruit texture atlas through Hash function encryption, uploading hash values onto a blockchain for evidence storage, and obtaining a block number of the blockchain where the fruit texture atlas is located;

F, storing the block number and fruit texture atlas information corresponding to the block number on a local application server.

Specifically, the step E includes:

E1, a process prior to uploading, including: performing a Hash function encryption to the fruit texture atlas for one time to obtain a string of hash values bound with the fruit texture atlas, signing the hash values with asymmetric encryption algorithm, and confirming that a sender holds a corresponding private key based on a public key and signature information so as to transform the fruit texture atlas into a blockchain readable mode and meanwhile bind an identity of the sender with information sent by the sender through the signature information; and E2, an uploading process, including: sending processed data to nodes of the blockchain to form a blockchain transaction and enter an uploading stage; after receiving the blockchain transaction, broadcasting, by each of the nodes of the blockchain, the blockchain transaction as received to other nodes firstly to form a unified transaction pool, in which transaction data contains hash values of packaged transactions in a current block and the packaged transactions need to be sorted according to a unified order; after confirming a block header and the hash values, calculating block hash values and forming a chain by connecting a previous block hash value to a current block hash value, so as to complete the uploading process.

Further, the credible fruit traceability method based on fruit texture atlas and blockchain further includes: performing a Hash function encryption to traceability information of the reference fruit, uploading hash values onto the blockchain for evidence storage one by one to obtain a corresponding block number, and updating the block number and the traceability information onto the local application server in one-to-one correspondence. The traceability information includes fruit variety information, planting information, cold chain logistics information and so on. The blockchain-based upload method of the traceability information is the same as that described above.

Further, the credible fruit traceability method based on fruit texture atlas and blockchain further includes the following steps:

G, traceability query: obtaining a fruit texture atlas of a fruit to be inspected by the encoding method described above, matching the fruit texture atlas of the fruit to be inspected with a corresponding fruit texture atlas of a reference fruit on the local application server by the identification method described above to obtain a block number corresponding to the reference fruit, obtaining hash values of the fruit texture atlas of the reference fruit stored on the blockchain through the block number, performing a Hash function encryption to the fruit texture atlas of the reference fruit stored on the local application server to obtain hash values of a local fruit texture atlas, and comparing the hash values of the fruit texture atlas of the reference fruit stored on the blockchain with the hash values of the local fruit texture atlas to determine a consistency there-between.

Further, obtaining traceability information, a block number of the fruit texture atlas and a block number of the traceability information of the fruit to be inspected from the local application server through the fruit texture atlas of the fruit to be inspected; performing a Hash function encryption to the fruit texture atlas and the traceability information of the fruit to be inspected, respectively, to obtain hash values, and comparing the obtained hash values with hash values stored on the blockchain obtained through the block number of the fruit to be inspected to determine a consistency there-between, so as to judge whether the fruit to be inspected is a fruit corresponding to the fruit texture atlas stored on the blockchain, and to judge whether the traceability information has been tampered with.

Consumers can trace a fruit by taking picture(s) of the pedicel part and/or naval part of the fruit by using a device with camera function, such as smart phone or other smart devices.

The Fifth Embodiment

Fruit Texture Atlas Generation and Blockchain-Based Upload Device

The present invention provides a fruit texture atlas generation and blockchain-based upload device for the method described above. The device includes a fruit texture atlas generation module and a blockchain-based upload module, wherein, The fruit texture atlas generation module includes an image acquisition device and a fruit texture atlas feature code generation device. The image acquisition device is used for capturing images of a fruit pedicle part and a fruit navel part of each fruit to be encoded, respectively. The fruit texture atlas feature code generation device is used for graying the images of fruit pedicel part and fruit navel part respectively, normalizing the images to convert them into a rectangular image of fruit pedicel part and a rectangular image of fruit navel part, extracting features from the rectangular image of fruit pedicel part and the rectangular image of fruit navel part respectively, encoding the features to obtain a fruit pedicel feature code table and a fruit navel feature code table, performing a merging operation on the fruit pedicel feature code table and the fruit navel feature code table to obtain a combined bidirectional feature code table;

The blockchain-based upload module is used for signing fruit texture atlas data obtained by the fruit texture atlas generation module through Hash function encryption, uploading hash values onto a blockchain for evidence storage, and obtaining a block number of the blockchain where the fruit texture atlas is located; and is used for signing traceability information through Hash function encryption, uploading hash values onto the blockchain for evidence storage, and obtaining a block number of the traceability information.

Further, the fruit texture atlas generation and blockchain-based upload device further includes an application server which is used for storing the fruit texture atlas, the traceability information and corresponding block numbers of fruits.

Further, the image acquisition device includes a flexible clamping unit, a synchronous rotation unit and an image acquisition unit, wherein, The flexible clamping unit has a bidirectional telescopic function and is used for clamping both sides of each of different fruits according to their sizes and shapes;

The synchronous rotation unit can realize 180-degree rotation, and is used for rotating the clamped fruits, so as to obtain one image of the fruit pedicel part and one image of the fruit navel part for each fruit;

The image acquisition unit is used for triggering image acquisition at regular intervals, and is used for capturing one image of the fruit pedicle part and one image of the fruit naval part for each fruit to be encoded.

Further, the fruit texture atlas generation and blockchain-based upload device further includes a traceability tool, and the traceability tool includes a camera module, a calculation module and a communication module. The traceability tool is used for taking photos of fruit pedicle part or fruit navel part, obtaining a fruit texture atlas through image processing, verifying the authenticity of product through comparison, and realizing product traceability.

The Sixth Embodiment

Credible Fruit Traceability System Based on Fruit Texture Atlas and Blockchain

Figure 5:
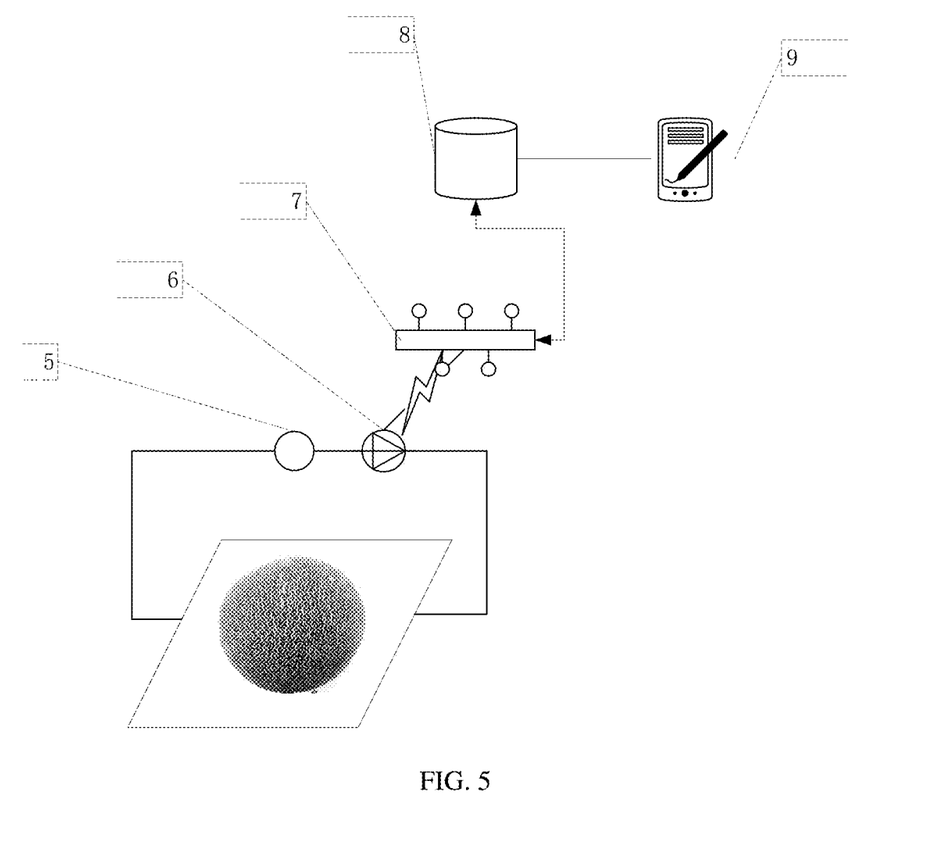
FIG. 5 is a schematic diagram illustrating the principle of a credible fruit traceability system based on fruit texture atlas and blockchain according to a specific embodiment of the present invention.

As shown in FIG. 5, this embodiment provides a credible fruit traceability system based on fruit texture atlas and blockchain. The system includes a fruit texture atlas generation module 5, a blockchain-based upload module 6, a blockchain server 7, a local application server 8 and a client terminal 9. The fruit texture atlas generation module 5 obtains an image of a surface of the fruit (at the fruit pedicle part or fruit navel part), and generates a fruit texture atlas through edge positioning, circle extraction, normalization processing, image enhancement, feature extraction, feature encoding, code table merging and the like. The blockchain-based upload module 6 signs the generated fruit texture atlas through Hash function encryption and uploads hash values onto a blockchain for evidence storage by a process prior to uploading and an uploading process, and obtains a block number of the blockchain where the fruit texture atlas is located; and signs traceability information through Hash function encryption, uploads hash values onto the blockchain for evidence storage, and obtains a block number of the traceability information. The blockchain server is used for storing the hash values of the fruit texture atlas and the hash values of the traceability information. The client terminal 9 is used for taking photos of the fruit pedicel part and fruit navel part; obtaining the traceability information, the block number of the fruit texture atlas and the block number of the traceability information of the fruit on the local application server through the fruit texture atlas; performing Hash function encryption to the fruit texture atlas and the traceability information of the fruit, respectively, to obtain hash values, and comparing the obtained hash values with the hash values stored on the blockchain and obtained through the block number, to verify the authenticity of the product and realize the product traceability.

The fruit texture atlas generation module and the blockchain-based upload module in the system of this embodiment, optionally, are the same as the corresponding components of the fruit texture atlas generation and blockchain-based upload device of the fifth embodiment. The client terminal can be a smart phone or other smart devices with a camera module, a calculation module and a communication module.

The above description shows and describes several preferred embodiments of the present invention. However, as mentioned before, it should be understood that the present invention is not limited to the forms disclosed in this specification, and should not be regarded as the exclusion of other embodiments, but can be used in various other combinations, modifications and environments, and can be modified by the above teaching or the technology or knowledge in related fields within the scope of the inventive concept described in this specification. However, the modifications and changes made by those skilled in the art do not depart from the spirit and scope of the present invention, and should be within the scope of protection of the appended claims.

What is claimed is:

1. A computer-implemented encoding method of fruit texture atlas information, the computer-implemented encoding method comprising:
   obtaining an image of fruit pedicel part and an image of fruit navel part, of a fruit to be encoded;
   graying the image of fruit pedicel part and the image of fruit navel part, respectively, and normalizing the images to transform the images into a rectangular image of fruit pedicel part and a rectangular image of fruit navel part;
   extracting features from the rectangular image of fruit pedicel part and the rectangular image of fruit navel part, respectively, encoding the features to obtain a fruit pedicel feature code table and a fruit navel feature code table; and
   performing a merging operation on the fruit pedicel feature code table and the fruit navel feature code table to obtain a combined bidirectional feature code table, thereby forming a fruit texture atlas that uniquely identifies the fruit.

2. The computer-implemented encoding method according to claim 1, wherein normalizing the images to transform the images into a rectangular image of fruit pedicel part and a rectangular image of fruit navel part comprises:
   positioning outer edges of the fruit pedicel part and of a core of the fruit navel part according to a difference between gray levels of the fruit pedicel part and of an external skin in the image of fruit pedicel part and according to a difference between gray levels of the fruit navel part and of the external skin in the image of fruit navel part, and extracting center positions of the fruit pedicel part and the fruit navel part;
   drawing two concentric circles by taking the extracted center positions of the fruit pedicel part and the fruit navel part as centers of circles and taking predetermined distances R1 and R2 from centers to edges of the fruit pedicel part and of the fruit navel part as radiuses of circles, and extracting a circular ring between the two concentric circles as an area to be processed; and
   normalizing the area to be processed by:

$$I(x(r,\theta),y(r,\theta)) \rightarrow I(r,\theta),$$

wherein, $$\begin{cases} x(r,\theta) = (1-r)x_i(\theta) + rx_0(\theta) \\ y(r,\theta) = (1-r)y_i(\theta) + ry_0(\theta) \end{cases},$$

wherein, I (x,y) represents an image of the circular ring; (r,θ) represents normalized polar coordinates, r∈[0,1], θ∈[0°,360°]; when r=0, it indicates that I (x(r,θ,y(r,θ)) is a pixel point at an inner edge of the image of the circular ring; when r=1, it indicates that I (x(r,θ,y(r,θ)) is a pixel point at an outer edge of the image of the circular ring; (r, θ) of each point $(x_i, y_i)$ in the area to be processed is determined by considering a relationship of the each point with a center point $(x_0, y_0)$, and the image of the circular ring is transformed into a rectangular image I(r,θ) by taking r and θ as rectangular coordinates.

3. The computer-implemented encoding method according to claim 2, further comprising performing a histogram equalization to the transformed rectangular image of fruit pedicel part and the transformed rectangular image of fruit navel part, respectively, to enhance the rectangular images, thereby obtaining a clearer texture;

wherein performing a histogram equalization is expressed as:

$$S(r_k) = T(r_k) = \frac{1}{N}\sum_{i=0}^{k} N(r_k),$$

wherein N is a total number of pixels of the rectangular image to be enhanced, $N(r_k)$ is the number of pixels with a gray level of $r_k$, k is a gray level number, $T(r_k)$ is a transfer function for the gray level of $r_k$, and $S(r_k)$ is a transformed gray level.

4. The computer-implemented encoding method according to claim 1, wherein extracting features from the rectangular image of fruit pedicel part and the rectangular image of fruit navel part respectively and encoding the features to obtain a fruit pedicel feature code table and a fruit navel feature code table comprises:

extracting an average energy value u and a variance o of each channel by using Haar wavelet transform and performing a K-means clustering to obtain an image of the circular ring of a small sample set;

extracting texture information of the image of the circular ring by using two-dimensional Gabor filtering to obtain a corresponding texture feature parameter; wherein an expression of the two-dimensional Gabor filtering is:

$$G(x, y) = \exp\left(-\frac{x_1^2 + y_1^2}{2\sigma^2}\right)\exp\left(i2\pi\frac{x_1}{\lambda}\right),$$

wherein $x_1 = x \cos θ + y \sin θ$, $y_1 = -x \sin θ + y \cos θ$, λ is a wavelength specified in pixels, and θ represents a direction;

C3, after obtaining the texture feature parameter, determining a positivity or a negativity of a real part and an imaginary part of a coefficient of the texture feature parameter to perform quantitative encoding, comprising:

$$h_{Re} = \begin{cases} 1 & \text{Re}\{ifft(G(f) \cdot fft(I(r)))\} \geq 0 \\ 0 & \text{Re}\{ifft(G(f) \cdot fft(I(r)))\} < 0 \end{cases}$$
$$(r = 1, 2, 3, \ldots, N),$$

$$h_{Im} = \begin{cases} 1 & \text{Re}\{ifft(G(f) \cdot fft(I(t)))\} \geq 0 \\ 0 & \text{Re}\{ifft(G(f) \cdot fft(I(t)))\} < 0 \end{cases}$$
$$(r = 1, 2, 3, \ldots, N),$$

wherein $h_{Re}$ and $h_{Im}$ represent the real part and the imaginary part of the texture feature parameter obtained through filtering, respectively; fft represents a Fourier transform; and ifft represents a Fourier inversion.

5. The computer-implemented encoding method according to claim 1, wherein performing a merging operation on the fruit pedicel feature code table and the fruit navel feature code table to obtain a combined bidirectional feature code table comprises:

$$T = T_A \cup T_B = \{X_{(i,j)} | X_{(i,j)} \in T_A \text{ or } X_{(i,j)} \in T_B\},$$

wherein T represents the combined bidirectional feature code table, $T_A$ and $T_B$ represent the fruit pedicel feature code table and the fruit navel feature code table, respectively, and X (i, j) is a value corresponding to row i and column j in the bidirectional feature code table.

6. An identification method based on fruit texture atlas, comprising:

obtaining a fruit texture atlas of a reference fruit by the computer-implemented encoding method according to claim 1;

performing an image feature encoding to a fruit to be identified to obtain a feature code table, and matching the obtained feature code table with a feature code table of the fruit texture atlas of the reference fruit so as to identify feature information of the fruit texture atlas.

7. The identification method according to claim 6, wherein performing the image feature encoding comprises:

performing the matching by using a classifier based on Hamming distance (HD), which is calculated by a formula of:

$$HD = \frac{1}{N}\sum_{j=1}^{N} P_j(XOR)Q_j,$$

wherein N is a bit number of texture feature code, XOR represents an exclusive-OR operation, and $P_j$ and $Q_j$ represent a $j^{th}$ bit of texture feature codes P and Q, respectively;

if a determined HD is greater than a predetermined first threshold value, it's judged that the fruit to be identified is different from the reference fruit; if the determined HD is less than the predetermined first threshold value, it's judged that the fruit to be identified is the same fruit with the reference fruit.

8. The identification method according to claim 7, wherein performing the image feature encoding comprises:

identifying the feature information of the fruit texture atlas according to the combined bidirectional feature code table, firstly;

if it is judged that the fruit to be identified is the same fruit with the reference fruit, the identification is ended; otherwise, if a difference between the determined HD and the predetermined first threshold value is less than a predetermined difference value, the feature information is further identified according to the fruit pedicle feature code table and the fruit naval feature code table extracted from the bidirectional feature code table, respectively; and if one of the determined HDs obtained according to the fruit pedicle feature code table and the fruit naval feature code table is less than the predetermined first threshold value, it is only necessary to determine the other one of the determined HDs being less than a predetermined second threshold value to judge that the fruit to be identified is the same fruit with the reference fruit, and the identification is ended.

* * * * *